(12) United States Patent
Masuda et al.

(10) Patent No.: US 9,956,613 B2
(45) Date of Patent: May 1, 2018

(54) SLIDING MEMBER AND PRODUCTION METHOD FOR SAME

(71) Applicant: Senju Metal Industry Co., Ltd., Tokyo (JP)

(72) Inventors: Satoshi Masuda, Tochigi-ken (JP); Naoki Sato, Tochigi-ken (JP); Ryoichi Kurata, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days. days.

(21) Appl. No.: 14/437,411

(22) PCT Filed: Oct. 22, 2013

(86) PCT No.: PCT/JP2013/078581
§ 371 (c)(1),
(2) Date: Apr. 21, 2015

(87) PCT Pub. No.: WO2014/065279
PCT Pub. Date: May 1, 2014

(65) Prior Publication Data
US 2015/0273584 A1  Oct. 1, 2015

(30) Foreign Application Priority Data
Oct. 25, 2012  (JP) ................. 2012-235656

(51) Int. Cl.
*B32B 15/08*  (2006.01)
*B22F 3/24*  (2006.01)
(Continued)

(52) U.S. Cl.
CPC ............... *B22F 3/24* (2013.01); *B22F 3/10* (2013.01); *B22F 3/16* (2013.01); *B22F 5/00* (2013.01);
(Continued)

(58) Field of Classification Search
None
See application file for complete search history.

(56) References Cited

U.S. PATENT DOCUMENTS

| 5,041,339 A | 8/1991 | Mori et al. |
| 5,337,872 A | 8/1994 | Kawamura et al. |

(Continued)

FOREIGN PATENT DOCUMENTS

| CN | 1222105 A | 7/1999 |
| CN | 1497147 A | 5/2004 |

(Continued)

OTHER PUBLICATIONS

Extended European Search Report from the European Patent Office for EP 13849924.9, dated Sep. 9, 2015, 7 pages.

(Continued)

*Primary Examiner* — Daniel J Schleis
(74) *Attorney, Agent, or Firm* — Chernoff, Vilhauer, McClung & Stenzel, LLP

(57) ABSTRACT

A sliding member having a hardness proper for an environment where a high-pressure is applied and having a good abrasion resistance. A sliding member 1 comprises a first sintered compact layer 2 formed by solidifying an iron-based metallic powder with a sinter; and a second sintered compact layer 3 formed by solidifying a copper-based metallic powder on a surface of the first sintered compact layer 2 to improve a sliding characteristic. The second sintered compact layer 3 is densified by a blast process where the powder is collided against a surface of the second sintered compact layer 3.

2 Claims, 4 Drawing Sheets

(51) Int. Cl.
  *B22F 3/10* (2006.01)
  *B22F 7/06* (2006.01)
  *F16C 33/14* (2006.01)
  *B32B 15/01* (2006.01)
  *B22F 5/00* (2006.01)
  *B22F 7/00* (2006.01)
  *B22F 7/02* (2006.01)
  *B22F 3/16* (2006.01)
  *F16C 33/12* (2006.01)

(52) U.S. Cl.
  CPC ............... *B22F 7/008* (2013.01); *B22F 7/02* (2013.01); *B22F 7/06* (2013.01); *B32B 15/01* (2013.01); *F16C 33/14* (2013.01); *F16C 33/145* (2013.01); *B22F 2207/17* (2013.01); *B22F 2998/10* (2013.01); *F16C 33/121* (2013.01); *F16C 2202/04* (2013.01); *Y10T 428/12028* (2015.01)

(56) References Cited

U.S. PATENT DOCUMENTS

| | | | |
|---|---|---|---|
| 5,592,840 | A * | 1/1997 | Miyasaka ............... C21D 7/06 29/90.7 |
| 5,885,375 | A | 3/1999 | Takemura |
| 5,958,522 | A | 9/1999 | Nakagawa |
| 6,015,775 | A * | 1/2000 | Takayama ............... B22F 3/24 419/8 |
| 6,245,836 | B1 | 6/2001 | Nakamaru et al. |
| 6,294,029 | B1 | 9/2001 | Sakate et al. |
| 6,523,456 | B1 | 2/2003 | Kobayashi et al. |
| 6,770,381 | B2 | 8/2004 | Kanayama et al. |
| 7,541,086 | B2 | 6/2009 | Gartner |
| 7,662,472 | B2 | 2/2010 | Tanaka |
| 7,833,609 | B2 | 11/2010 | Fujita et al. |
| 8,017,668 | B2 | 9/2011 | Tanaka et al. |
| 8,252,733 | B2 | 8/2012 | Tanizawa et al. |
| 9,303,230 | B2 | 4/2016 | Tomikawa et al. |
| 2003/0064239 | A1 | 4/2003 | Saitou et al. |
| 2007/0031651 | A1 | 2/2007 | Kagohara et al. |
| 2009/0004030 | A1 | 1/2009 | Sugioka |
| 2009/0305917 | A1 | 12/2009 | Tanizawa et al. |
| 2009/0311476 | A1 | 12/2009 | Stetina et al. |
| 2010/0052262 | A1 | 3/2010 | Ishida |
| 2011/0044572 | A1 | 2/2011 | Kano |
| 2013/0216169 | A1 * | 8/2013 | Zidar ............... C22C 9/00 384/276 |
| 2014/0303050 | A1 | 10/2014 | Tomikawa et al. |
| 2015/0049966 | A1 | 2/2015 | Sato |
| 2015/0273584 | A1 | 10/2015 | Masuda |

FOREIGN PATENT DOCUMENTS

| | | |
|---|---|---|
| CN | 1242480 C | 2/2006 |
| CN | 101400453 A | 4/2009 |
| DE | 102010053338 A1 | 6/2012 |
| EP | 0872296 A1 | 10/1998 |
| EP | 1985856 A1 | 10/2008 |
| EP | 2402606 A1 | 1/2012 |
| EP | 2833008 B1 | 11/2016 |
| GB | 2273747 A | 6/1994 |
| GB | 2285265 A | 7/1995 |
| GB | 2396624 A | 6/2004 |
| JP | 59-075914 A | 4/1984 |
| JP | 59-126753 A | 7/1984 |
| JP | 62-030851 A | 2/1987 |
| JP | 62-112769 A | 5/1987 |
| JP | 02-066106 A | 3/1990 |
| JP | H04232244 A | 8/1992 |
| JP | 07-190065 A | 7/1995 |
| JP | H07243307 A | 9/1995 |
| JP | H07243308 A | 9/1995 |
| JP | 08-120370 A | 5/1996 |
| JP | H08209320 A | 8/1996 |
| JP | 09-049006 A | 2/1997 |
| JP | 10-060617 A | 3/1998 |
| JP | 10-267033 A | 10/1998 |
| JP | 2000-303161 A | 10/2000 |
| JP | 2000-320555 A | 11/2000 |
| JP | 2001-294904 A | 10/2001 |
| JP | 3425496 B2 | 7/2003 |
| JP | 2004-360731 A | 12/2004 |
| JP | 2006-070811 A | 3/2006 |
| JP | 2007-285312 A | 1/2007 |
| JP | 2007-284706 A | 11/2007 |
| JP | 2008164097 A | 7/2008 |
| JP | 2008-274762 A | 11/2008 |
| JP | 4848821 B2 | 12/2011 |
| JP | 5304974 B1 | 10/2013 |
| TW | 201213052 A | 4/2012 |
| WO | 1995/025224 | 9/1995 |
| WO | 1997/047418 A1 | 12/1997 |
| WO | WO2011127513 * | 10/2011 |
| WO | 2013/039177 A1 | 3/2013 |
| WO | 2013146108 A1 | 10/2013 |

OTHER PUBLICATIONS

International Search Report from priority PCT Application No. PCT/JP2013/078581, dated Dec. 10, 2013, 4 pgs.
Office Action issued by the Taiwan Intellectual Property Office, Ministry of Economic Affairs for TW102138396, dated Nov. 2, 2015, 8 pages.
Decision to Grant a Patent issued by the Japanese Patent Office for JP 201-516873, dated May 28, 2013, 6 pages.
Notification of First Office Action prepared by the State Intellectual Property Office of P.R. China for CN201380016371.2, dated Apr. 16, 2015, 6 pages.
Office Action prepared by the USPTO for U.S. Appl. No. 14/388,016 (Pub. No. 2015-0049966); dated Mar. 30, 2015, 11 pages.
Final Office Action prepared by the USPTO for U.S. Appl. No. 14/388,016 (Pub. No. 2015-0049966); dated Jul. 21, 2015, 13 pages.
Office Action prepared by the USPTO for U.S. Appl. No. 14/388,016 (Pub. No. 2015-0049966); dated Feb. 19, 2016, 8 pages.
Final Office Action prepared by the USPTO for U.S. Appl. No. 14/388,016 (Pub. No. 2015-0049966); dated Jun. 22, 2016, 11 pages.
Response to Office Action for U.S. Appl. No. 14/388,016 (Pub. No. 2015-0049966) filed Jun. 29, 2015, 6 pages.
After Final Response to Final Office Action for U.S. Appl. No. 14/388,016 (Pub. No. 2015-0049966) filed Oct. 21, 2015, 7 pages.
After Final Response to Final Office Action for U.S. Appl. No. 14/388,016 (Pub. No. 2015-0049966) filed Jan. 21, 2016, 7 pages.
Response to Office Action for U.S. Appl. No. 14/388,016 (Pub. No. 2015-0049966) filed Jun. 13, 2016, 6 pages.
After Final Response to Final Office Action for U.S. Appl. No. 14/388,016 (Pub. No. 2015-0049966) filed Sep. 14, 2016, 7 pages.
Request for Continued Examination and Response to Final Office Action for U.S. Appl. No. 14/388,016 (Pub. No. 2015-0049966) filed Nov. 22, 2016, 7 pages.
European Patent Office, Examination Report issued in EP Application No. 13 849 924.9-1373, dated Feb. 16, 2017, 5 pages.
The State Intellectual Property Office of P.R. China, Notification of Second Office Action, dated Mar. 14, 2017 in Chinese Application No. 201380055969.2, 6 pgs.
European Patent Office, Examination Report issued in European Application No. 13849924.9, dated Sep. 22, 2017, 4 pages.
Machine translation of Japanese Patent No. 62-112769, published May 23, 1987, to Shimazu Tadahiro, 4 pages.
Japanese Patent Office, International Preliminary Report on Patentability for International Application No. PCT/JP2013/053713, dated Aug. 20, 2015, 5 pages, translation prepared by WIPO.
Japanese Patent Office, Notification of Rejection Reason(s), issued in Japanese Patent Application No. 2015-500060 dated Dec. 13, 2016, 28 pages.

(56) References Cited

OTHER PUBLICATIONS

Surface Technology Handbook, First Edition, published Feb. 27, 1998 by Surface Technology Association, pp. 839-841.
Metal Surface Treatment of JIS Handbook, First Edition, published Apr. 24, 1998 by Japanese Standards Association, pp. 389-396.
Steel I of JIS Handbook, First Edition, published Jan. 31, 2002 by Japanese Standards Association, pp. 1097-1098.
Toshifumi Kubohori et al., Influence of Blasting on Substrate Properties, High Temperature Journal, vol. 32, No. 6, published Nov. 2006 by High Temperature Society, pp. 313-320.
Japanese Patent Office; Search Report for International Application No. PCT/JP2013/053713, dated Mar. 12, 2013, 1 page.
US Patent and Trademark Office, Office Action for U.S. Appl. No. 15/024,595, dated Jul. 15, 2016, 11 pages.
US Patent and Trademark Office, Office Action for U.S. Appl. No. 15/024,595, dated Dec. 16, 2016, 9 pages.
European Patent Office, Examination Report issued in European App. No. 13849924.9, dated Sep. 22, 2017, 4 pages.

* cited by examiner

SLIDING MEMBER AND PRODUCTION METHOD FOR SAME

TECHNICAL FIELD

The present invention relates to a sliding member for slidably supporting an object to be slid and a method of manufacturing the sliding member.

BACKGROUND

Traditionally, a sliding member, comprising a copper-based alloy bonded on a steel plate, has been frequently used. In such a sliding member, it is necessary to extract a desired shape from the steel plate so that occurred remnants cannot contribute to a product. On the other hand, for the sliding member without extraction, it has proposed for a bearing to form an outer layer with an iron-based sintered compact and form an inner layer with a copper-based sintered compact. (Refer to, for example, Patent Document 1.)

In addition, it is a well-known technology heretofore to form a concave portion on a surface of the sliding member with a blast process and it is a known technology to form an oil reservoir on the surface of the sliding member with the blast process. (Refer to, for example, Patent Document 2).

DOCUMENTS FOR PRIOR ART

Patent Documents

Patent Document 1: JP UM59-75914A
Patent Document 2: JP2007-284706A

SUMMARY OF THE INVENTION

Problems to be Solved by the Invention

It is possible to form the oil reservoir on a sliding surface by applying a shot-blast process to the sliding surface to make its friction coefficient low so as to accomplish a good sliding characteristic. In addition, it is possible to accomplish the good sliding characteristic by making the sliding layer of the copper-based alloy. However, in a conventional sliding member having the sliding layer made of the copper-based alloy, its hardness is not enough and a desired sliding characteristic cannot be kept in an environment where a high-load is applied in a hydraulic equipment and the like.

An object of the present invention is to provide a sliding member that has a hardness better suited for a high-load environment and is excellent in an abrasion resistance. An object of the present invention is to provide a method of manufacturing the sliding member while suppressing as much as possible an occurrence of remnants that do not contribute to a product wherein the manufactured sliding member has the hardness better suited for the high-load environment and is excellent in the abrasion resistance.

Means for Solving the Problems

The inventors of the present invention have found out that a blast process is applied to a sintered compact of a copper-based alloy to densify the sintered compact, enhance its hardness and form concavities and convexities on a surface of the sintered compact. A roughness of the surface is enough to make oil reservoirs suitable for the abrasion resistance and the like.

The present invention is the sliding member that comprises a first sintered compact layer formed by molding and sintering first metallic powder; and a second sintered compact layer formed on one surface of the first sintered compact layer by molding and sintering second metallic powder different from the first metallic powder in composition. The second sintered compact layer is densified by an impact process wherein the powder is collided against one surface of the second sintered compact layer.

It is desirable to form the first sintered compact layer with the first metallic powder of iron-based material and to form the second sintered compact layer with the second metallic powder of copper-based material.

It is desirable to densify the second sintered compact layer where a hardness of at least one surface thereof as a sliding surface is equal to or larger than Hv (Vickers hardness) 150 but equal to or less than Hv 250 and preferably equal to or larger than Hv 170 but equal to or less than Hv 220.

The present invention is a method of manufacturing a sliding member that includes a step for forming a first sintered compact layer by molding first metallic powder and sintering the molded first metallic powder; a spreading step for spreading second metallic powder on at least one surface of the first sintered compact layer as a sliding surface while matching with a shape of the first sintered compact layer, the second metallic powder having a composition different from the first metallic powder; a sintering step for forming a second sintered compact layer by combining the second metallic powder with each other and combining the second metallic powder with the first metallic powder while keeping the shape matched with the shape of the first sintered compact layer at the sintering process for solidifying the second metallic powder spread on the one surface of the first sintered compact layer; and a blast step for densifying the second sintered compact layer by reducing void portions by applying a pressure so as to smash the void portions at an impact process for colliding the powder against at least one surface of the second sintered compact layer. It is desirable to include a second sintering step for sintering the sliding member again after the aforementioned blast step.

Effects of the Invention

According to the sliding member of the present invention, the second sintered compact layer as a sliding layer can have a high hardness characteristic suitable for an environment wherein a high-load is applied. The invention can form an oil reservoir on the surface of the second sintered compact layer and can keep a low friction and an abrasion resistance through an oil film.

According to the method of the present invention for manufacturing the sliding member, since the first sintered compact layer is molded and sintered while matching with the shape of the sliding member as the completed product, the invention can eliminate remnants, which is different from a manufacturing method of extracting from a steel. Alternatively, the invention can reduce remnants significantly in a case that a molding is required while matching with the shape of the completed product. Therefore, the invention can reduce a cost by decreasing a used amount of materials.

EMBODIMENT FOR IMPLEMENTING THE INVENTION

A sliding member according to an embodiment of the present invention will be explained hereinafter by reference to the attached drawings.

[Configuration Example of Sliding Member According to Embodiment of Invention]

Figure 1:
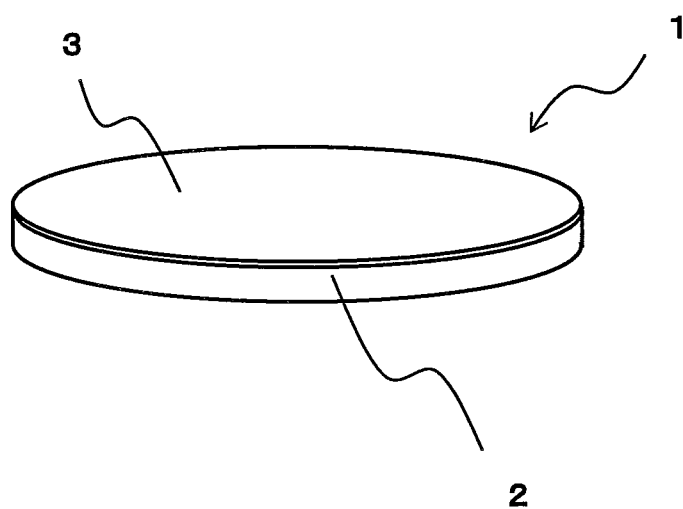
FIG. 1 is a perspective view for showing an overview of a sliding member according to a subject embodiment.

FIG. 1 is a perspective view for showing an overview of a sliding member according to the subject embodiment. FIGS. 2A, 2B, 2C, 2D and 2E are explanation drawings for showing one example of manufacturing steps for the sliding member according to the subject embodiment.

A sliding member 1 of the subject embodiment comprises a first sintered compact layer 2 and a second sintered compact layer 3 wherein the sliding member 1 is configured as a plate. The first sintered compact layer 2 is solidified by sintering metallic powder having a predetermined composition. The second sintered compact layer 3 is formed on a surface as one plane of the first sintered compact layer 2 wherein the second sintered compact layer 3 is solidified by sintering metallic powder having a composition that is different from the metallic powder for the first sintered compact layer 2 in order to improve a sliding characteristic.

In the sliding member 1, the second sintered compact layer 3 is densified by an impact process called a blast process wherein the metallic powder having predetermined quality of material and grain size is collided against the surface of the second sintered compact layer 3. In the sliding member 1, the densified second sintered compact layer 3 becomes a sliding layer and the first sintered compact layer 2 acts as a back metal that supports the second sintered compact layer 3 as the sliding layer.

The first sintered compact layer 2 is configured by being solidified with the sintering process of the metallic powder having the predetermined composition that is the powder of iron (Fe) or an alloy comprising the iron as a main component and copper (Cu) or the like as an additive. The second sintered compact layer 3 is configured by being solidified with the sintering process of the metallic powder having the predetermined composition that is the powder of the copper-tin (Cu—Sn) based alloy in order to improve the sliding characteristic.

In a case that the sliding member is configured only by a component corresponding to the first sintered compact layer 2, there is a possibility of seizure and the sliding characteristic is worse if a member to be slid is made of iron. Therefore, the sliding characteristic is improved by providing the sliding layer of the Cu-based alloy on the surface of the Fe-based first sintered compact layer 2.

In the sliding member 1, since the blast process densifies the second sintered compact layer 3, the hardness of the second sintered compact layer 3 as the sliding layer is improved. Therefore, the sliding layer is formed to have a desired hardness required for the environment where the high-load is applied. In addition, in the sliding member 1, since the blast process densifies the second sintered compact layer 3, the second sintered compact layer 3 is molded to have a desired thickness. Moreover, in the sliding member 1, the blast process densifies the second sintered compact layer 3 and its hardness is improved so that a joint strength between the first sintered compact layer 2 and the second sintered compact layer 3 is improved.

In the sliding member 1, since the blast process is applied to the surface of the second sintered compact layer 3, the sliding layer having a desired surface roughness is formed wherein the oil reservoir is formed on the surface of the second sintered compact layer 3 so that the sliding characteristic can be improved.

[Example Method for Manufacturing Sliding Member of Subject Embodiment]

A method of manufacturing the sliding member according to the subject embodiment will be explained by reference to each drawing.

Figure 2A:
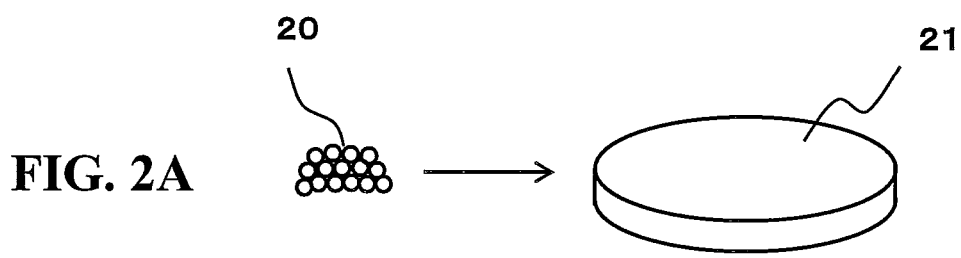
FIG. 2A is an explanation drawing for showing one example of a manufacturing step for the sliding member according to the subject embodiment.

As shown in FIG. 2A, the first sintered compact layer 2 is formed by a powder compression molding of first metallic powder 20 that is metallic powder having a predetermined composition wherein the powder compression molding is processed while matching with the shape of the sliding member 1 as the completed product. As described hereinbefore, the first metallic powder 20 consists of the powder of iron (Fe) or the alloy comprising the iron as the main component and copper (Cu) or the like as the additive.

Figure 2B:
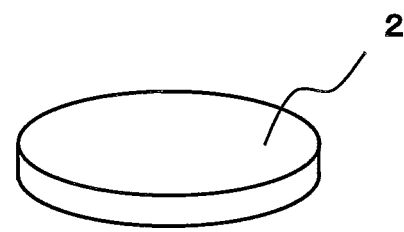
FIG. 2B is an explanation drawing for showing one example of the manufacturing step for the sliding member according to the subject embodiment.

As shown in FIG. 2B, in the first sintered compact layer 2, the first metallic powder 20 is combined with each other by a sintering process for solidifying a mass 21 of the first metallic powder 20 molded to the predetermined shape while keeping the shape of the sliding member 1 as the completed product.

In a conventional sliding member, a back metal was manufactured by extracting a desired shape from a plate material. Therefore, remnants occurred, which did not contribute to the product. The remnants were disposed. In the past, for manufacturing the back metal, a required material covered both the back metal as the product and the portions of the remnants so that a used amount of the material was large and it was difficult to reduce the cost.

On the other hand, in the sliding member 1 of the subject embodiment, the sintered compact layer 2 as the back metal is molded and sintered while matching with the shape of the sliding member 1 as the completed product. Thus, the remnants can be eliminated or the remnants can be significantly reduced when requiring the molding for matching with the shape with the completed product. Therefore, the used amount of the material can be reduced and the cost can be saved.

Figure 2C:
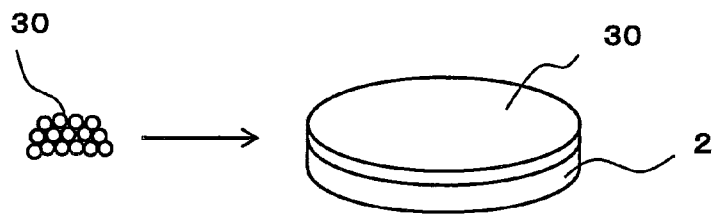
FIG. 2C is an explanation drawing for showing one example of the manufacturing step for the sliding member according to the subject embodiment.

As shown in FIG. 2C, in the second sintered compact layer 3, second metallic powder 30 is spread on the surface of the first sintered compact layer 2 for the sliding surface wherein the first sintered compact layer 2 has been sintered while matching with the shape of the sliding member 1 as the completed product. The composition of the second metallic powder 30 is different from that of the first metallic powder 20. The second metallic powder 30 consists of the powder of the copper-tin (Cu—Sn) based alloy as discussed hereinbefore.

Figure 2D:
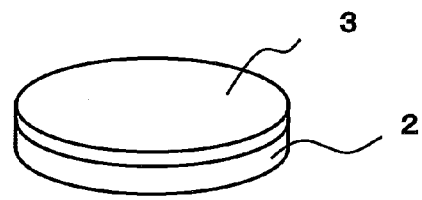
FIG. 2D is an explanation drawing for showing one example of the manufacturing step for the sliding member according to the subject embodiment.

As shown in FIG. 2D, in the second sintered compact layer 3, the second metallic powder 30 is combined with each other and the second metallic powder 30 is combined with the first sintered compact layer 2 by the sintering process. This sintering process solidifies the second metallic powder 30 spread on the surface of the first sintered compact layer 2 while keeping its shape matched with the shape of the first sintered compact layer 2.

Figure 2E:
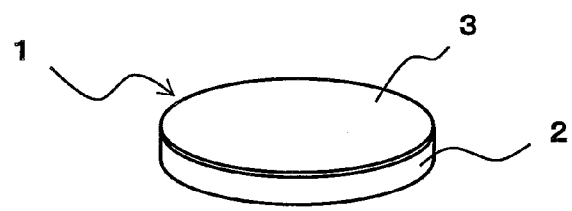
FIG. 2E is an explanation drawing for showing one example of the manufacturing step for the sliding member according to the subject embodiment.

The second sintered compact layer 3 is solidified by sintering the second metallic powder 30 spread on the surface of the first sintered compact layer 2 to combine the second metallic powder 30 with each other. However, voids exist. In order to solve this, after the sintering process, the second sintered compact layer 3 is densified to decrease the void portions by the blast process for colliding the powder against the surface as shown in FIG. 2E wherein the pressure is applied to smash the void portions. In this example, according to the blast process, the hardness of at least one surface of the second sintered compact layer 3 as the sliding surface is equal to or larger than Hv 150 but equal to or less than Hv 250 and preferably equal to or larger than Hv 170 but equal to or less than Hv 220.

In the past, a press compression process densified the sintered compact. However, in the press compression process, it was required to consider a size variation based on the compressed material. In order to obtain, for example, about Hv 200 for the hardness of the sliding surface, a back metal having a high hardness was required to accept a pressure for increasing the hardness of the sliding surface. Therefore, a material used for the back metal was limited. On the other hand, the densification with the blast process can apply the pressure to make, for example, about Hv 200 of the sliding surface's hardness for smashing the void portions. In addition, a pressure for compressing the material is not applied so that it is not necessary to consider the compression of the material. Therefore, the hardness of the sliding surface can be high regardless of the back metal hardness.

The sintering process for solidifying the second metallic powder 30 spread on the surface of the first sintered compact layer 2 is called a "first sinter". A second sintering process, which is called a "second sinter", may be executed for the second sintered compact layer 3 densified by the blast process.

The first sintering process solidifies the second metallic powder 30 and the second sintering process is executed for the second sintered compact layer 3 densified by the blast process. Therefore, the alloy at the densified portion of the second sintered compact layer 3 can be further combined with each other.

The blast process for the second sintered compact layer 3 after the first sinter is called a "first blast". A second blast process called a "second blast" may be applied to the second sintered compact layer 3 having the portion where the alloy densified by the first blast process is further combined with each other by the second sinter.

The second blast process is executed for the second sintered compact layer 3 where the alloy at the portion densified by the first blast process is further combined with each other by the second sinter. Therefore, the hardness of the second sintered compact layer 3 is increased by further increasing the densification.

[Embodiment]
(1) Comparison of Hardness with and without Blast Process

Both the sliding layer and the back metal are configured with the sintered compact by using alloy material having compositions shown in Table 1 below. The hardness has been compared between the embodiment where the blast process is applied to the aforementioned second sintered compact layer 3 as the sliding layer and a comparison example where a sliding layer is formed on a surface of a back metal of the steel and a rolling process is applied by a press. A hardness measurement has been executed with a micro-Vickers hardness test.

TABLE 1

|  | Embodiment | Comparison Example |
| --- | --- | --- |
| Alloy Material | Cu—10Sn | Cu—10Sn—Pb |
| Back Metal Material | Fe Sintered compact | Steel Plate |
| Alloy Hardness | about Hv 200 | about Hv 100 |
| Back Metal Hardness | about Hv 160 | about Hv 140 |

Figure 3:
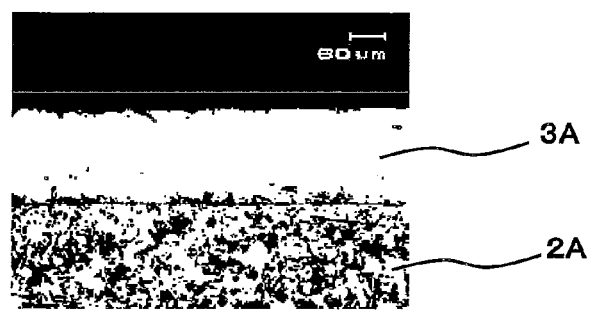
FIG. 3 is a microscope photograph of the sliding member according the embodiment.
Figure 4:
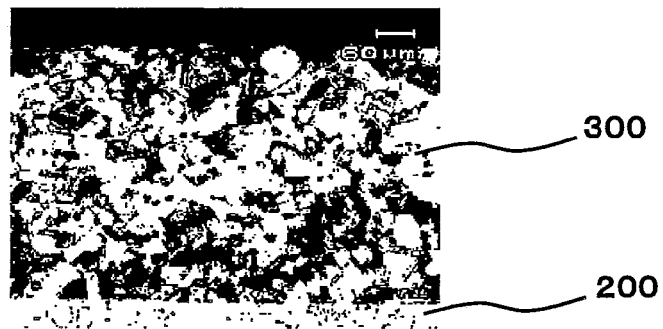
FIG. 4 is a microscope photograph of the sliding member according a comparison example.

FIG. 3 is a microscope photograph of the sliding member according the embodiment and FIG. 4 is a microscope photograph of the sliding member according the comparison example. In the sliding member of the embodiment, the sliding layer 3A is densified as shown in FIG. 3 and its hardness is about Hv 200 wherein the sliding layer 3A is configured by the second sintered compact layer 3 shown in FIG. 1 and manufactured by the manufacturing method explained by reference to FIGS. 2A, 2B, 2C, 2D and 2E. The hardness of the back metal 2A configured by the first sintered compact layer 2 is about Hv 160.

On the other hand, in the sliding member of the comparison example, the sliding layer 300 is not sufficiently densified as shown in FIG. 4 and its hardness is about Hv 100. The hardness of the back metal is about Hv 140. It is understood that the hardness of the sliding layer in the sliding member of the embodiment is significantly improved in comparison with the comparison example wherein the sliding member of the embodiment is densified by applying the blast process to the sliding layer 3A configured with the sintered compact. Moreover, in the sliding member of the embodiment, the second sintered compact layer 3 as the sliding layer 3A can be formed thinly and the used amount of the material can be decreased to reduce cost.

In the sliding member of the embodiment, the back metal 2A configured with the sintered compact can eliminate the remnant or reduce significantly the remnant so that the used amount of the material can be decreased and the cost can be reduced. It is understood that, in the sliding member of the embodiment, the hardness of the back metal 2A is about Hv 160 and the hardness of the sliding layer 3A is about Hv 200 and is harder than the back metal 2A. Therefore, it is understood that the sliding member of the embodiment can make the hardness of the sliding layer 3A high regardless of the hardness of the back metal 2A.

(2) Comparison of Surface Shape with and without Blast Process

The surface shapes of the sliding layers have been compared between the aforementioned sliding members of the embodiment and the comparison example.

Figure 5:
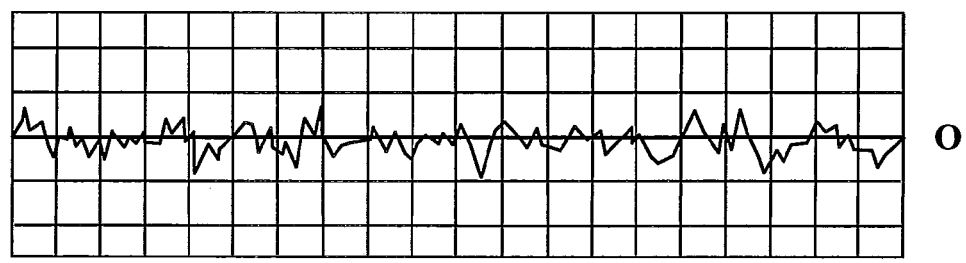
FIG. 5 is a graph for showing a roughness condition of a surface of a sliding layer according to the embodiment.
Figure 6:
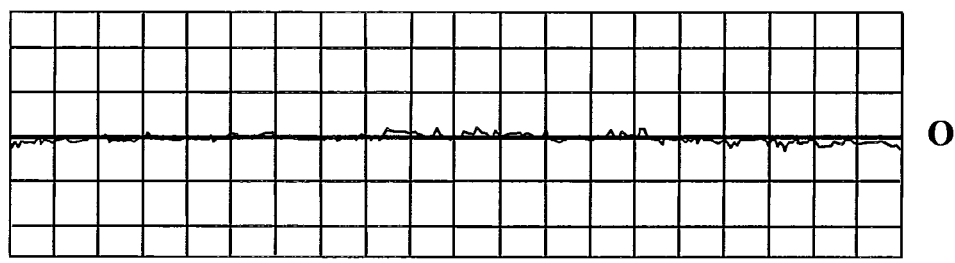
FIG. 6 is a graph for showing a roughness condition of a surface of a sliding layer according to the comparison example.

FIG. 5 is a graph of showing a roughness condition of the surface of the sliding layer according to the embodiment and FIG. 6 is a graph of showing the roughness condition of the surface of the sliding layer according to the comparison example. FIGS. 5 and 6 are based on the standard of JIS B 0601 (1994) here.

In the sliding member of the embodiment, the blast process is applied to the second sintered compact layer 3 as the sliding layer of FIG. 1 manufactured by the manufacturing method that has been explained by reference to FIGS. 2A, 2B, 2C, 2D and 2E. Therefore, the surface of the sliding layer has a shape of concavity and convexity and its arithmetic average roughness (Ra) is about 2.0 μm. On the other hand, in the sliding member of the comparison example, its arithmetic average roughness (Ra) is about 0.3 μm.

(3) Durability Relationship with and without Blast Process

In order to verify an influence affecting a durability, such as erosion based on differences in the above mentioned surface shape and hardness, the sliding members of the embodiment and the comparison example have been applied to bearings of a piston pump for the test. A test condition is as follows.

Figure 7:
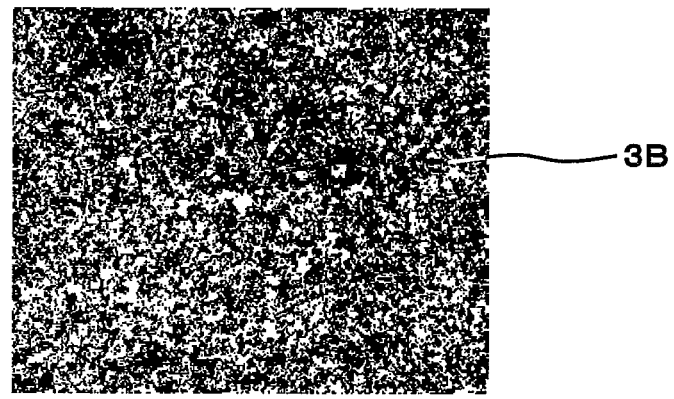
FIG. 7 is a microscope photograph of the sliding layer surface after a test of the sliding member according the embodiment.
Figure 8:
FIG. 8 is a microscope photograph of the sliding layer surface after a test of the sliding member according the comparison example.

Discharge pressure: 0-28 MPa
Number of cycle: 250 thousand cycles (ON: 1 sec, OFF: 1 sec)
Oil temperature: 60° C. (hydraulic oil: equivalent to VG32)
Number of shaft rotation: N=1,800 rpm FIG. 7 is a microscope photograph of the sliding layer surface after the test of the sliding member according the embodiment and FIG. 8 is a microscope photograph of the sliding layer surface after the test of the sliding member according the comparison example.

In the sliding member of the embodiment, the blast process forms the shape of the concavity and convexity upper and under a centerline O of the roughness as shown in the aforementioned FIG. 5. Such shape makes the oil reservoir on the surface of the sliding layer that acts to hold an oil film. There is no erosion vestige on the sliding layer surface 3B as shown in FIG. 7.

On the other hand, in the sliding member of the comparison example whose sliding layer surface is smooth in comparison with the embodiment, there is no convex portion upper the centerline O of the roughness as shown in FIG. 6. Therefore, no oil reservoir is formed and there is the erosion on the sliding layer surface 300B after the test as shown in FIG. 8.

As described hereinbefore, it is understood that the sliding member according to the embodiment provides the shape of the concavity and convexity on the sliding surface with the blast process and improves its hardness to suppress the erosion. Moreover, it is understood that the abrasion resistance is improved and the seizure is prevented under the environment of the boundary lubrication.

INDUSTRIAL APPLICABILITY

The sliding member of the present invention is preferable to the bearing of the hydraulic equipment where a high-load is applied.

The invention claimed is:

1. A sliding member, comprising:
a first sintered compact layer formed by sintering a quantity of a first alloy powder; and
a second sintered compact layer formed on a first surface of said first sintered compact layer and formed by sintering a quantity of a second alloy powder, the second sintered compact layer consisting of the second alloy powder and being different from said first alloy powder in composition, and the second alloy powder being made of copper-based material;
wherein a surface of said second sintered compact layer opposite to the first surface of said first sintered compact layer is configured as a sliding surface of the sliding member and said second sintered compact layer is densified by an impact process wherein a quantity of a powder is collided against the sliding surface and thereby reduces void portions in said second sintered compact layer; and
wherein said sliding surface has a hardness that is equal to or larger than Hv 150 but equal to or less than Hv 250.

2. The sliding member according to claim 1, wherein said first alloy powder of said first sintered compact layer is of iron-based material.

* * * * *